US012732776B2

(12) United States Patent
Long

(10) Patent No.: US 12,732,776 B2
(45) Date of Patent: Sep. 8, 2026

(54) METHOD FOR PROVIDING A SERVICE

(71) Applicant: DIGITAL FIRST HOLDINGS LLC, Atlanta, GA (US)

(72) Inventor: Justin Long, Kennesaw, GA (US)

(73) Assignee: Digital First Holdings LLC, Atlanta, GA (US)

( * ) Notice: Subject to any disclaimer, the term of this patent is extended or adjusted under 35 U.S.C. 154(b) by 213 days.

(21) Appl. No.: 18/217,222

(22) Filed: Jun. 30, 2023

(65) Prior Publication Data

US 2025/0008297 A1 Jan. 2, 2025

(51) Int. Cl.
*H04W 4/02* (2018.01)

(52) U.S. Cl.
CPC .................................. *H04W 4/023* (2013.01)

(58) Field of Classification Search
CPC .................................................... H04W 4/023
See application file for complete search history.

(56) References Cited

U.S. PATENT DOCUMENTS 10,445,711 B1 10/2019 Arumugam
11,096,059 B1 * 8/2021 Shahidzadeh .......... G06Q 50/10
11,257,067 B1 2/2022 Yang et al.
11,276,050 B1 * 3/2022 Lightowler ........... G06T 19/006
12,067,100 B1 * 8/2024 Baker .................... G06Q 20/20
2014/0358777 A1 * 12/2014 Gueh ................ G06Q 20/1085 705/43
2015/0287017 A1 10/2015 Iqbal et al.
2016/0132851 A1 * 5/2016 Desai ................ G06Q 20/3227 705/21
2018/0204204 A1 * 7/2018 Giraudo .............. H04L 12/2854
2022/0180363 A1 6/2022 Mattison et al.
2024/0144238 A1 * 5/2024 Osborn ................ G06Q 20/405
2024/0179498 A1 * 5/2024 Cho .................... H04L 65/1016

FOREIGN PATENT DOCUMENTS

EP 4029790 A1 7/2022

OTHER PUBLICATIONS

Nov. 19, 2024 Search Report in corresponding European Patent Appl. No. 24185459.5.
European examination report for corresponding European Patent Appl. No. 24185459.5, dated Aug. 18, 2025.

* cited by examiner

*Primary Examiner* — Erika A Washington
(74) *Attorney, Agent, or Firm* — Notaro, Michalos & Zaccaria P.C.; John S Economou

(57) ABSTRACT

A data processing system comprises a control device and a service device. The system determines a location (1) of the control device and determines a location (2) of the service device. When the control device is in proximity to the service device, the system authenticates (3) the control device at the service device. The control device receives a service request (4) from a user. The control device transmits (5) a service request message to the service device. The service device processes (6) the service request message. The service device transmits a service outcome message (7) to the control device. The control device provides output data (8) to the user. The system ceases display (9) of customer information on the display screen of the service device.

13 Claims, 1 Drawing Sheet

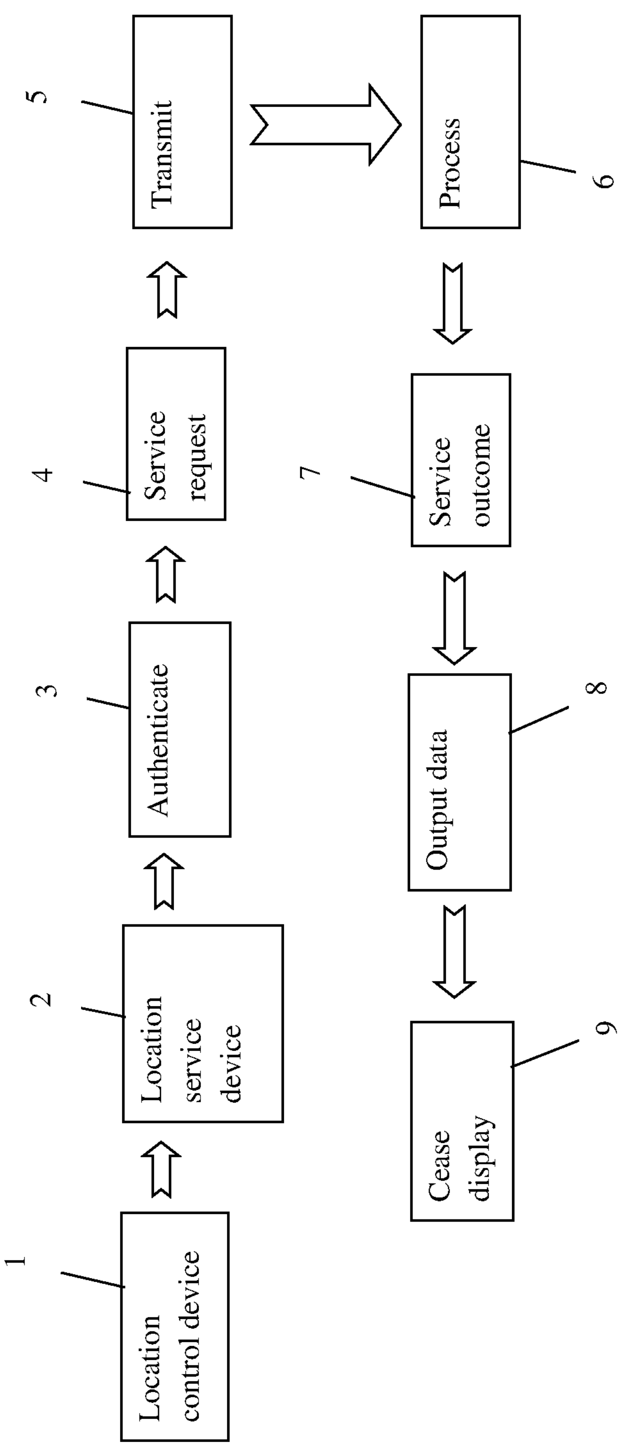
1
Location control device
2
Location service device
3
Authenticate
4
Service request
5
Transmit
6
Process
7
Service outcome
8
Output data
9
Cease display

METHOD FOR PROVIDING A SERVICE

FIELD OF THE INVENTION

This invention relates to a computer-implemented method for providing a service.

BACKGROUND

It is known for a customer to perform financial transactions using an automated teller machine (ATM), such as withdrawing cash or lodging cheques. However some customers may find it difficult or even impossible to operate certain ATMs. There is also a risk of fraudulent actions being performed by a third party, such as stealing of customer data or unauthorised access to a customer bank account.

This invention is aimed at providing an improved method which overcomes at least some of these difficulties.

SUMMARY

According to the invention there is provided a computer-implemented method for providing a service, the method comprising the steps of: a control device receiving a service request from a user, the control device transmitting a service request message to a service device, the service device processing the service request message, the service device transmitting a service outcome message to the control device, and the control device providing output data to the user.

The user interacts with the control device to request the service and to subsequently receive the output data. It is therefore significantly simpler and easier for the user to operate the control device than to operate a potentially complicated or unfamiliar ATM. This may be particularly relevant for a user with haptic difficulties, or with an illness that restricts control of the hand or fingers, or with a physical handicap. It is possible for the user to configure the functionality of the control device. The control device allows more customer preferences to be taken into account than with a generic ATM. In this manner the user may choose exactly how they wish to receive the service in their own preferred way.

The method of the invention enables the user to use the direct control of the control device to indirectly control the service device. The control device facilitates the user to obtain a service without interacting directly with the service device. The user is therefore not required to use a user interface of the service device directly. This results in enhanced data security because the user will be viewing a display screen of the control device rather than a large display screen of the ATM which may be visible to a passer-by. It is therefore not possible for a fraudulent third party to attempt to steal a customer's log-in details or to attempt to access a customer's bank account.

Because the user interacts with the control device, the user is not required to touch the service device directly. In this manner the method of the invention achieves enhanced hygiene for the user which is especially relevant in the case of a pandemic.

The control device may be part of a collaboration communication session with the user and with the service device.

The method may comprise the steps of: determining a location of the control device, determining a location of the service device, and determining whether the control device is in proximity to the service device.

For example the location may be determined using a beacon device, or a GPS device, or a Bluetooth device, or a near field communication (NFC) tapping device, or a facial recognition camera device, or a biometric data recognition device.

The method may comprise the step of authenticating the control device at the service device based on whether the control device is in proximity to the service device. The method may comprise the step of responsive to the control device being authenticated, the service device processing the service request message. By authenticating the control device, this ensures that the security of the system is maintained and that the service is only provided to the correct user.

The control device may transmit the service request message to the service device on a first data channel.

Each data channel may have different capabilities. For example a first data channel may be a mobile phone, and a second data channel may be an identification document scanner at a teller machine. The teller machine includes a capability to dispense cash.

The system may perform a negotiation process to determine the optimum data channel to use. The control device and the service device may perform the negotiation process to determine the optimum data channel to use. A particular data channel may result in optimum performance or optimum accuracy.

The data channel may be selected based on a preference of a user.

The data channel may be selected based on one or more business rules.

The control device may comprise at least one of a mobile device, a wearable device, a smart watch, a user interface of a wheelchair, a neural implant device, a user interface of a computer device, or a remote teller device to control a teller machine.

The service device processing the service request message may comprise the step of navigating a display screen of the service device. The method of the invention includes collaboration between the service device and the control device to delegate navigation of the display screen of the service device to the control device. The service device processing the service request message may comprise the step of selecting a service option on the display screen of the service device.

The service device may comprise at least one of a teller machine, a cash dispenser device, a printer device, a display device, a user interface device, a document scanner device, or an Internet of Things (IoT) enabled device.

The service device may transmit the service outcome message to the control device on a second data channel, the second data channel being different to the first data channel.

Each data channel may have different capabilities. For example a first data channel may be a mobile phone, and a second data channel may be an identification document scanner at a teller machine. The teller machine includes a capability to dispense cash.

The system may perform a negotiation process to determine the optimum data channel to use. The control device and the service device may perform the negotiation process to determine the optimum data channel to use. A particular data channel may result in optimum performance or optimum accuracy.

The data channel may be selected based on a preference of a user.

The data channel may be selected based on one or more business rules.

The output data may comprise at least one of video data, image data, audio data, text data, or haptic data.

The system may perform a negotiation process to determine the optimum type of output data to use.

The method may comprise the step of the control device displaying a visual reproduction of an image on the display screen of the service device.

The method may comprise the steps of: creating an augmented image based on the image on the display screen of the service device, and the control device displaying the augmented image.

The augmented image may better fit the screen size of the control device than the original image on the display screen of the service device.

The method may comprise the step of ceasing display of information on the display screen of the service device. This results in enhanced data security because no confidential customer data will be displayed on the display screen of the service device which may be visible to a passer-by. It is therefore not possible for a fraudulent third party to attempt to steal a customer's log-in details or to attempt to access a customer's bank account.

The user may comprise a customer.

In another aspect of the invention there is provided a data processing system for providing a service, the system comprising a control device, a service device, and a processor configured to: receive a service request from a user at the control device, transmit a service request message from the control device to the service device, process the service request message at the service device, transmit a service outcome message from the service device to the control device, and provide output data to the user at the control device.

The user interacts with the control device to request the service and to subsequently receive the output data. It is therefore significantly simpler and easier for the user to operate the control device than to operate a potentially complicated or unfamiliar ATM. This may be particularly relevant for a user with haptic difficulties, or with an illness that restricts control of the hand or fingers, or with a physical handicap. It is possible for the user to configure the functionality of the control device. The control device allows more customer preferences to be taken into account than with a generic ATM. In this manner the user may choose exactly how they wish to receive the service in their own preferred way.

The system of the invention enables the user to use the direct control of the control device to indirectly control the service device. The control device facilitates the user to obtain a service without interacting directly with the service device. The user is therefore not required to use a user interface of the service device directly. This results in enhanced data security because the user will be viewing a display screen of the control device rather than a large display screen of the ATM which may be visible to a passer-by. It is therefore not possible for a fraudulent third party to attempt to steal a customer's log-in details or to attempt to access a customer's bank account.

Because the user interacts with the control device, the user is not required to touch the service device directly. In this manner the system of the invention achieves enhanced hygiene for the user which is especially relevant in the case of a pandemic.

The invention also provides in another aspect a computer program product stored on a non-transitory computer readable storage medium, the computer program product comprising instructions capable of causing a computer system to perform a method of the invention when the computer program product is executed on the computer system.

BRIEF DESCRIPTION OF THE DRAWING

An embodiment of the invention will be described hereinafter, by way of example only, with reference to the accompanying drawing, in which:

FIG. 1 is a flow diagram of a method according to the invention for providing a service.

DETAILED DESCRIPTION

Referring to FIG. 1 there is illustrated a data processing system according to the invention in use. The system may be employed to provide a service, such as to process a financial transaction requested by a customer, or to process a mortgage service, or to process a teller machine transaction, or to process a financial loan service, or to process a retail point of sale transaction to purchase goods.

The system comprises a control device. For example the control device may be a mobile device, and/or a wearable device, and/or a smart watch, and/or a user interface of a wheelchair, and/or a neural implant device.

The system also comprises a service device. For example the service device may be a teller machine, and/or a cash dispenser device, and/or a printer device, and/or a display device, and/or a user interface device, and/or a document scanner device, and/or an Internet of Things (IoT) enabled device.

The system determines a location 1 of the control device and determines a location 2 of the service device. The system calculates whether the control device is in proximity to the service device, for example using a proximity sensor. When the control device is in proximity to the service device, the system authenticates 3 the control device at the service device.

The control device receives a service request 4 from a user, such as a customer. For example the service request may be a request to withdraw cash from an ATM. The control device transmits 5 a service request message to the service device on a first data channel. The service device checks that the control device has been authenticated, and the service device then processes 6 the service request message.

As an example the processing 6 of the service request message may be to navigate a cursor around a display screen of the service device. As another example the processing 6 of the service request message may be to select a service option on the display screen of the service device.

The service device transmits a service outcome message 7 to the control device on a second data channel. The second data channel is different to the first data channel. The optimum data channel may be selected based on the data transmission payload. The service device transmits the service outcome message 7 to the control device regardless of the final location of the control device. For example the service device transmits the service outcome message 7 to the control device even after a period of time has elapsed, and even if the user with the control device has travelled away from the service device. The user may therefore continue the communication session even after leaving the location of the service device.

The control device provides output data 8 to the user. The output data 8 may be video data, and/or image data, and/or audio data, and/or text data, and/or haptic data.

As an example the control device may display a visual reproduction of an image on the display screen of the service device.

As another example the system may create an augmented image based on the image on the display screen of the service device. The control device may then display the augmented image. For example if the user changes from using the display screen of a teller machine to using the display screen of a mobile phone, the system may augment the image to be displayed on the display screen of the mobile phone.

The system ceases display 9 of customer information on the display screen of the service device. In this manner the system provides for enhanced data security. The display screen of the service device may display other non-customer related data, such as advertising data.

Throughout the description and claims of this patent specification, the words "comprise" and "contain" and variations of them mean "including but not limited to" and they are not intended to and do not exclude other moieties, additives, components, integers or steps. Throughout the description and claims of this patent specification, the singular encompasses the plural unless the context otherwise requires. In particular, where the indefinite article is used, the patent specification is to be understood as contemplating plurality as well as singularity, unless the context requires otherwise.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

Features, integers, characteristics or groups described in conjunction with a particular aspect, embodiment or example of the invention are to be understood to be applicable to any other aspect, embodiment or example described herein unless incompatible therewith. All of the features disclosed in this patent specification including any accompanying claims, abstract and drawings, and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this patent specification including any accompanying claims, abstract and drawings, or to any novel one, or any novel combination, of the steps of any method or process so disclosed.

What is claimed is:

1. A computer-implemented method for providing a service, the method comprising the steps of:

a control device receiving a service request from a user, the control device transmitting a service request message to a service device via a first data channel, the service device processing the service request message based on a location of the control device, the service device transmitting a service outcome message to the control device via a second data channel independent of the location of the control device, the second data channel different from the first data channel, and the control device providing output data to the user.

2. The method as claimed in claim 1 wherein the control device comprises at least one of a mobile device, a wearable device, a smart watch, a user interface of a wheelchair, or a neural implant device.

3. The method as claimed in claim 1 wherein the service device processing the service request message comprises the step of navigating a display screen of the service device.

4. The method as claimed in claim 1 wherein the service device processing the service request message comprises the step of selecting a service option on the display screen of the service device.

5. The method as claimed in claim 1 wherein the service device comprises at least one of a teller machine, a cash dispenser device, a printer device, a display device, a user interface device, a document scanner device, or an Internet of Things (IOT) enabled device.

6. The method as claimed in claim 1 wherein the output data comprises at least one of video data, image data, audio data, text data, or haptic data.

7. The method as claimed in claim 1 wherein the method comprises the step of the control device displaying a visual reproduction of an image on the display screen of the service device.

8. The method as claimed in claim 1 wherein the method comprises the steps of:

creating an augmented image based on the image on the display screen of the service device, and the control device displaying the augmented image.

9. The method as claimed in claim 1 wherein the method comprises the step of ceasing display of information on the display screen of the service device.

10. The method as claimed in claim 1 wherein the user comprises a customer.

11. The method as claimed in claim 1, wherein the location of the control device for the control device transmitting the service request to the service device is a first location, wherein the location of the control device for the service device transmitting the service outcome message to the control device is a second location, and wherein a first proximity of the first location to the service device is different than a second proximity of the second location to the service device.

12. A computer-implemented method for providing a service, the method comprising the steps of:

receiving a service request from a user at a control device, transmitting, by the control device, a service request message to a service device, determining a location of the control device, determining a location of the service device, determining whether the control device is in proximity to the service device, the service device authenticating the control device only when the control device is in proximity to the service device, processing the service request message at the service device only after the control device is authenticated, transmitting, by the service device, a service outcome message to the control device independent of proximity of the control device to the service device, and providing, by the control device, output data to the user.

13. The method as claimed in claim 12 wherein the control device is not in proximity to the service device for the transmitting of the service outcome message.

* * * * *